United States Patent [19]

O'Neill

[11] 4,420,101

[45] Dec. 13, 1983

[54] SQUEEZE BOTTLE WITH SELF-VENTING DISPENSING CLOSURE

[75] Inventor: Richard K. O'Neill, Pomona, Calif.

[73] Assignee: Diamond International Corp., New York, N.Y.

[21] Appl. No.: 322,703

[22] Filed: Nov. 18, 1981

[51] Int. Cl.³ .............................................. B05B 11/04
[52] U.S. Cl. .................... 222/212; 222/494; 137/493; 137/859
[58] Field of Search ............... 222/206, 212, 213, 215, 222/491, 492, 494, 498, 511, 512, 544, 545; 239/327; 137/493, 493.8, 512.4, 859

[56] References Cited

U.S. PATENT DOCUMENTS

| | | | |
|---|---|---|---|
| 3,493,179 | 2/1970 | Lee | 239/327 |
| 3,527,242 | 9/1970 | Ansite | 137/512.4 X |
| 3,648,903 | 3/1972 | Marchant | 222/212 |
| 3,843,030 | 10/1980 | Micallef | 222/554 |
| 3,874,563 | 4/1975 | Schwartzman | 222/213 |
| 3,952,926 | 3/1976 | Nilson | 222/494 |
| 4,102,476 | 7/1978 | Loeffler | 222/209 |
| 4,179,051 | 12/1979 | Thomas | 222/494 |
| 4,196,857 | 4/1980 | Bauer | 239/327 |
| 4,226,367 | 10/1980 | Hayes | 239/327 |
| 4,247,048 | 1/1981 | Hayes | 239/396 |

*Primary Examiner*—Joseph J. Rolla
*Assistant Examiner*—Michael S. Huppert
*Attorney, Agent, or Firm*—Watson, Cole, Grindle & Watson

[57] ABSTRACT

A self-venting dispensing closure for fluid-tight engagement with a squeeze bottle includes a cap containing a fluid opening, a flexible disc on the cap containing a fluid bore which defines together with such opening a single fluid passageway through the closure, the cap including an annular wall defining a valve seat lying upstream of the fluid opening in the direction of product flow through the passageway, the disc having an annular valve thereon in engagement with the valve seat in a closed position of the passageway, and the valve being shiftable along the annular wall to positions respectively upstream and downstream of the valve seat in response to sub-atmospheric and super-atmospheric pressures within the bottle. In these shifted positions, the valve opens respectively into bottle venting and dispensing positions. An overcap in engagement with the cap may be provided for closing the fluid passageway in a non-use and/or storage condition of the bottle.

16 Claims, 18 Drawing Figures

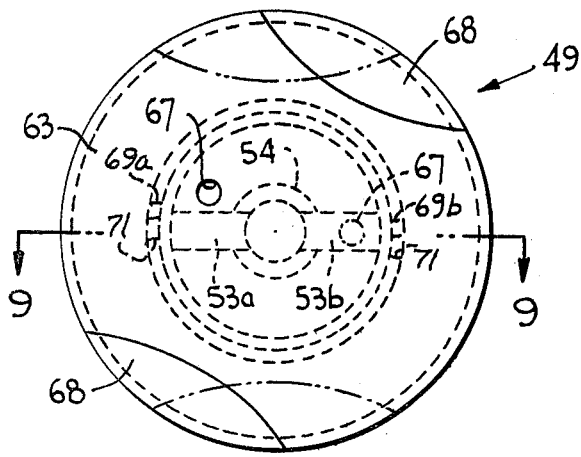
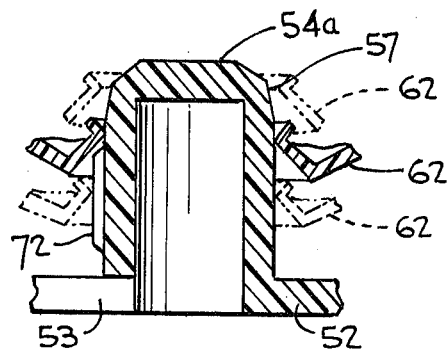
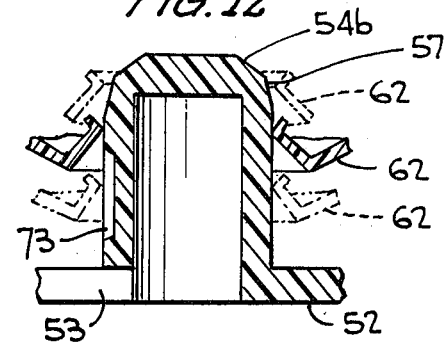
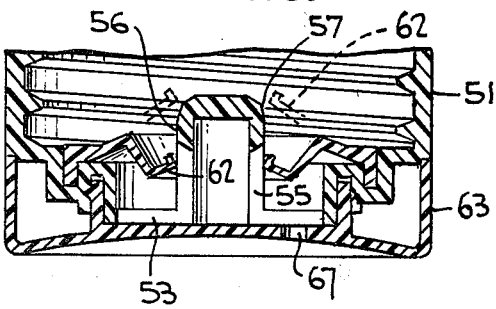
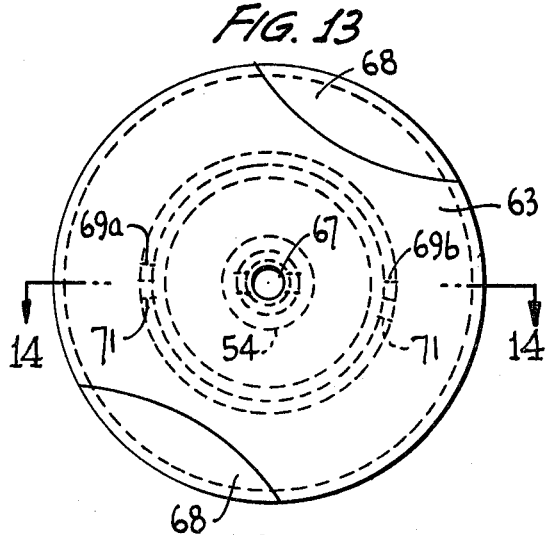
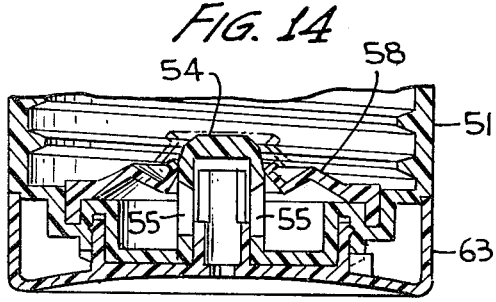
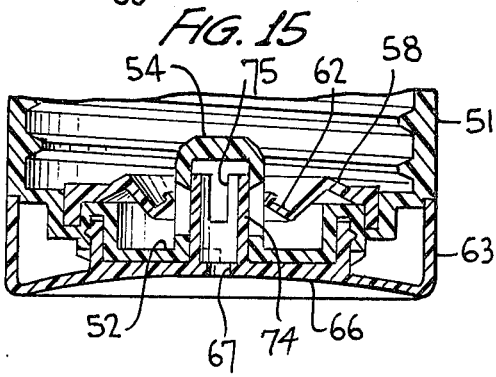

SQUEEZE BOTTLE WITH SELF-VENTING DISPENSING CLOSURE

BACKGROUND OF THE INVENTION

This invention relates generally to an improved dispensing closure for a squeeze bottle, and more particularly to such a dispensing closure having a self-venting feature which eliminates the need for a separate vent passage.

In prior squeeze bottle dispensing caps or closures, provision is usually made for the admission of atmospheric air into the container to permit reexpansion of the squeeze bottle as it is released after each squeeze or discharge stroke, thus preventing container collapse during the dispensing operation. Discharge of the product takes place through a valve controlled discharge passage which opens in response to an increase of pressure upon manual squeezing or deformation of the squeeze bottle, the discharge valve thereafter closing upon release of the bottle. A valve controlled container vent passage is separately provided for venting the bottle contents to the atmosphere during each recovery stroke as the vent valve opens to permit in flow of air from the atmosphere to the interior of the squeeze bottle each time the bottle is released and permitted to reexpand to its normal volume after being squeezed.

However, the discharge and container vent passages, each with separate valving to permit product discharge and container reexpansion, require special configurations which add to the number of parts needed to effect the controlled discharge and recovery operations. Separate valving thus affects reliability and increases the cost of manufacturing and assembly of the closure.

SUMMARY OF THE INVENTION

It is therefore an object of the present invention to provide a dispensing closure for use with any conventional commercially available squeeze bottle and comprising but a minimum number of parts so as to improve on the economy of production and assembly without comprising on efficiency and reliability during use.

Another object of this invention is to provide such a dispensing closure as having a combined valve controlled discharge and container vent passage extending from the interior of the bottle, through a combined discharge and vent port and through the discharge orifice.

A further object of the invention is to provide such a closure which includes a cap containing a fluid opening, a disc in the form of a flexible gasket on the cap and containing a fluid bore which defines together with the fluid opening a singular fluid passageway for the closure. The cap includes an annular wall having a valve seat lying upstream of the fluid opening in the direction of product flow through the passageway, and the disc has an annular valve thereon engaging the valve seat for closing the fluid passageway. First and second means on the annular wall lie respectively upstream and downstream of the valve seat to permit the fluid passageway to open into bottle venting and dispensing positions upon a shifting of the valve into juxtaposition with such means in response of the disc and/or its valve to sub-atmosheric and super-atmospheric pressures within the bottle. Dispensing may otherwise be effected by a flexing of the valve in response to super-atmospheric pressures within the bottle. And, means may be provided in engagement with the cap for closing the fluid passageway in a non-use and/or storage condition of the bottle.

In accordance with the several disclosed embodiments, such first means comprises a recess in the annular wall to facilitate venting, and such second means may comprise a longitudinally extending groove or rib on a pintle extending inwardly from an end wall of the cap which contains the fluid opening, the fluid bore in the disc surrounding the pintle and the valve being defined along the edge of such bore, to thereby facilitate the dispensing operation. Otherwise, the pintle may be hollow and have a slot in a side wall thereof in communication with the fluid opening to open the discharge as the valve moves to a position juxtaposed to such slot.

The means engaging the cap for closing fluid passageway in a non-use and/or storage condition of the bottle may be in the form of a overcap rotatably mounted on the cap and having a discharge orifice that is radially offset from the rotational axis of the overcap, the fluid opening underlying the orifice in an open rotational position of the overcap, and the orifice being misaligned with the fluid opening in a closed rotational position of the overcap.

Otherwise, the overcap may have a central orifice overlying the fluid opening in the cap, and a sleeve extending from the overcap into the hollow pintle and having a slot in its side wall in alignment with the pintle slot in an open rotational position of the overcap, the slots being out of alignment in a closed rotational position of the overcap.

Other objects, advantages and novel features of the invention will become more apparent from the following detailed description of the invention when taken in conjunction with the accompanying drawings.

BRIEF DESCRIPTION OF THE DRAWINGS

FIG. 8 is a plan view of another embodiment of a dispensing closure according to the invention;

FIGS. 9 and 10 are sectional views taken substantially along the line 9—9 of FIG. 8 respectively showing valve closing and dispensing positions;

FIGS. 11 and 12 are sectional views, at a slightly enlarged scale, of a portion of the FIGS. 8 to 10 embodiment showing alternatives for opening the valve to facilitate dispensing;

FIG. 13 is a plan view of a further embodiment of a dispensing closure according to the invention;

FIGS. 14 and 15 are sectional views taken substantially along the line 14—14 of FIG. 13 respectively showing valve closing and dispensing positions;

DETAILED DESCRIPTION OF THE INVENTION

Figure 1:
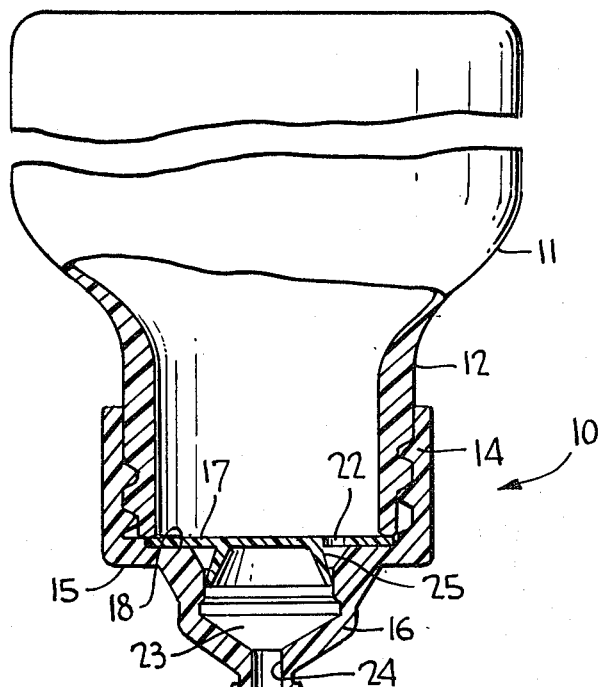
FIG. 1 is a side elevational view, in section, of one embodiment of a dispensing closure according to the invention shown mounted on the neck of a conventional squeeze bottle.

Turning now to the drawings wherein like reference characters refer to like and corresponding parts throughout the several views, one embodiment of the dispensing closure of the invention is generally designated 10 in FIG. 1 as including a cap in fluid-tight threaded engagement with a container 11 over the discharge or dispensing opening thereof formed in its neck 12. The container has a resiliently flexible wall or wall portion which may be alternately squeezed or indented to expel a portion of its contents and then released. Such a container is commonly termed a "squeeze bottle".

The dispensing closure has an internally threaded annular skirt 14, a surrounding shoulder 15 and a domed head portion 16. A circular disc 17 formed as a diaphragm or gasket of flexible resilient material, is seated centrally against an inner wall 18 of the cap and lies within a depression defining an annular wall 19 to prevent side-by-side shifting of the disc. The disc is clamped into place by the container neck with its outer terminal edge 21 bearing against the opposite side of the disc.

The disc contains a fluid bore 22 defining a combined discharge and container vent opening located upwardly of wall 18 in communication with fluid passageway 23 terminating in a fluid opening discharge orifice 24. The fluid passageway is valve controlled by an annular valve 25 in sealing engagement at its terminal edge 26 with a valve seat 27 in a closing position of FIG. 2. Valve 25 is integrally formed on or otherwise attached to disc 17 as an inwardly flared annular flange of like material. The inner annular surface of the dome defines a wall of predetermined diameter forming valve seat 27. This surface likewise defines a wall 28 of greater diameter lying downstream of the valve seat in the direction of the outflow of product from the container. A conical wall 29 joins walls 27 and 28, and a conical wall 31, of varying diameter greater than wall 27, lies upstream thereof in the direction of product flow outwardly of the container and joins walls 27 and 18. Of course, an annular wall of constant diameter, greater than wall 27, may instead be formed upstream of wall 27 without departing from the invention.

Discharge orifice 24 of the dispensing cap may be in the form of a discharge spout having a closed tip or dispensing end 32 which is adapted to be cut off in order to permit dispensing therethrough of the container contents.

Figure 5:
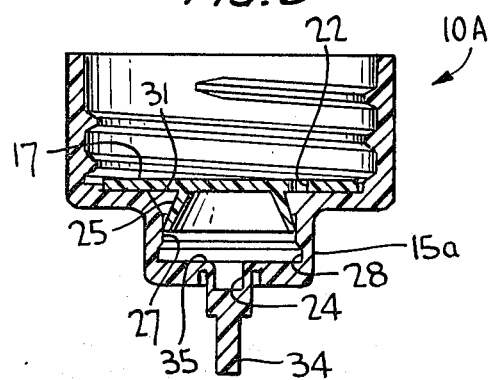
FIGS. 5, 6 and 7 are views similar to FIG. 1, without the squeeze bottle, of various means for closing the discharge orifice in the container cap.
Figure 6:
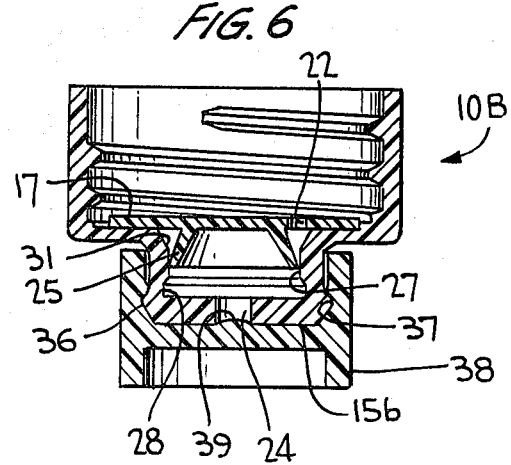
Figure 7:
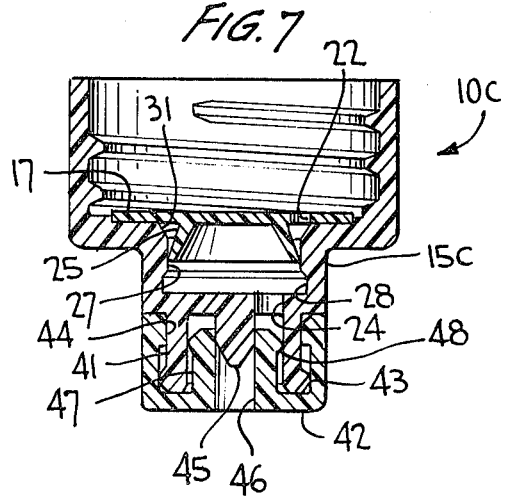

The FIGS. 5, 6 and 7 embodiments are essentially the same as that of FIG. 1, except that the head portions of each dispensing cap is formed slightly differently to accommodate different closures for each discharge opening 24. Squeeze bottle 11 is not shown in these Figures for the sake of clarity. Thus, container cap 10A of FIG. 5 has a flat head portion 15a with a frangible break-off tab 34 formed integrally therewith. The tab has an annular weakened area 35 to facilitate easy tab removal.

Dispensing cap 10B of FIG. 6 likewise has a flat head portion 15b except that an annular locking bead 36 is formed thereon for engagement with an annular groove 37 formed in an overcap 38 which, when snapped into place, closed discharge orifice 24 as a central bead thereon tightly engages the outer edge of the discharge orifice.

Dispensing cap 10C of FIG. 7 has a head portion 15c from which an annular sleeve 41 outwardly extends. An overcap 42 slideably engages over skirt 41, and limit stops 43 and 44 respectively located on skirt 41 and on the overcap limit the outward extent of the overcap when being slid along the sleeve. A central pin 45 on head portion 15c extends into a central mating bore 46 of the overcap formed by a wall 47 having an outer annular sealing bead 48 engaging the inner surface of sleeve 41. Thus, bore 46 forms an extension of discharged orifice 24 as the overcap is slid outwardly until its wall 47 disengages pin 45.

In operation of each embodiment of the invention, as pressure is applied to the deformable container or squeeze bottle, as during a manual squeeze stroke, such pressure is transmitted to the flowable product to be dispensed from the container. Disc 17 thus flexed outwardly in the direction of the arrow FIG. 3, in response to such pressure, whereupon its valve 25 is unseated from valve seat 27 as the annular valve edge thereof moves into juxtaposition with enlarged diameter wall or recess 28. The flowable product within the container is discharged outwardly through discharge port 22 and discharge orifice 24. It will be manifest that the product will be intermittently injected through the discharge orifice each time the container is compressed as by manual squeezing. Between squeeze strokes, when the pressure is released and the container is permitted to expand, the reexpansion tendency will produce a subatmospheric pressure within the container interior so that the atmospheric pressure acting against disc 17 will flex the latter inwardly to unseat or open bore 22 as the annular valve edge of its valve 25 moves in the direction of the arrow of FIG. 4 into juxtaposition with enlarged diameter wall or recess 31. Thus, air is permitted to freely enter the container through the same discharge path via orifice 24 and bore 22. Equalization of pressure on opposite sides of disc 17 will permit the disc to resume its unstressed condition of FIG. 2.

Figure 2:
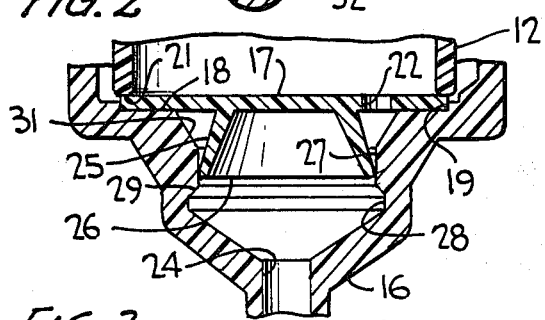
FIGS. 2, 3 and 4 are sectional views similar to FIG. 1, at a slightly enlarged scale, showing valve closing, discharge opening and container vent opening positions, respectively.
Figure 3:
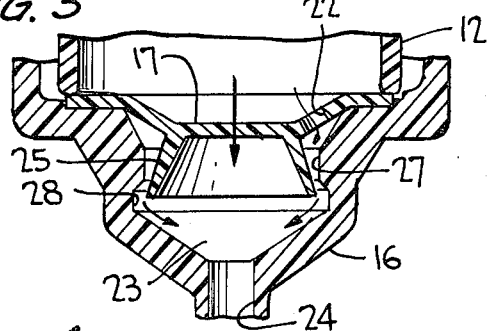
Figure 4:
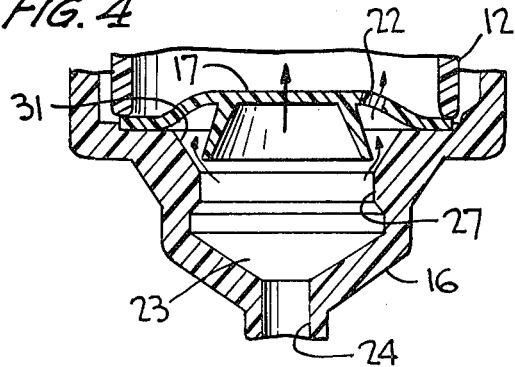

Valve 25 and the disc from which it extends may be formed of suitable plastic material having sufficient flexibility to permit relative resilient axial displacement of the disc from a normally unstressed and seated position of the valve, as in FIG. 2, to open and unseated positions of the valve, as in FIGS. 3 and 4.

The discharge and venting operations as aforedescribed are identical for the FIGS. 1, 5, 6 and 7 embodiments each having the same flexible disc, rigid valve 25, and enlarged wall diameters in head 15 relative to valve seat 27.

Another embodiment of the dispensing closure of the invention, generally designated 49, is shown in FIGS. 8 to 10 as including an internally threaded cap 51 adapted for fluid-tight engagement with the external threads on the neck of a squeeze bottle (not shown for clarity). Cap 51 has an end wall 52 containing radially extending fluid bores 53a, 53b, a hollow inwardly capped pintle 54 extending inwardly from the end wall. The pintle has opposed open slots 55 in its annular wall respectively in communication with bores 53. It should be pointed out that a pair of such bores and slots are provided for convenience in the assembly of the overcap to be described more fully hereinafter.

The external annular surface of the pintle lying upstream of slots 55 in the direction of product flow from the closure, defines an annular valve seat 56. Upstream of the valve seat is a smaller outer diameter section of the pintle essentially defining a recess 57, and a disc 58 in the form of a flexible diaphragm is press fitted to the inner side of cap 51 within an annular groove 59 to form a fluid-tight seal therewith. The disc has a central fluid bore 61, the edge of which defines a valve 62 in sealing engagement with the valve seat in an unstressed position of the diaphragm shown in FIG. 9 for closing the fluid bore. The disc may be of any suitable flexible resilient material, and/or may be in the form of a annular bellows spring which, in response to super-atmospheric pressure within the bottle occasioned during a squeeze stroke, permits the valve to be shifted outwardly along the wall of the pintle to its FIG. 10 position juxtaposed with slots 55 to facilitate the dispensing of product outwardly of the closure through one of the fluid openings 53.

An overcap 63 is rotatably mounted on cap 51 and has an annular rim 64 in frictional engagement with the walls of an annular groove 65 of the cap. An end wall 66 of the overcap bears against the outer surface of end wall 52 of the cap and contains a discharge orifice 67 that is radially offset from the rotational axis of the overcap a distance less than the maximum radial extent of openings 53. Thus, these fluid openings may be closed in a non-use and/or storage condition of the bottle simply upon rotation of the overcap relative to cap 51 until discharge orifice 67 is misaligned with opening 53, as shown in FIGS. 8 and 9. Otherwise, one of the fluid openings is uncovered in an operational condition of the closure as the overcap is rotated until its discharge orifice 67 overlies opening 53, as shown in FIG. 10 and as shown in FIG. 8 in phantom outline. A pair of opposed finger indentations 68 are provided in the annular side wall of the overcap to facilitate manual rotaty movement. And, a pair of stop elements 69*a*, 69*b* extend outwardly of cap 51 for indexing the open and closed positions of the overcap as a stop element 71 thereon strikes against one of the stop elements 69. Thus, in one assembled position of the overcap, its stop 71 will abut against stop 69*a* in an open rotational position in alignment with opening 53*b*, and will abut against stop 69*b* in a closed rotational position, FIG. 8. Otherwise, the overcap may be assembled with cap 51 such that stop elements 71 and 69*b* abut in an open rotational position uncovering opening 53*a*, while stop elements 69*a* and 71 abut in a closed rotational position.

Thus, during operation, the overcap is moved to its open rotational position in readiness for the dispensing of product during a manual squeeze stroke applied to the bottle causing the valve of the disc to move from its FIG. 9 to its FIG. 10 position in response to super-atmospheric pressure within the bottle. And, as in the FIG. 1 embodiment, when pressure is released between squeeze strokes permitting the container to expand, the reexpansion tendency will produce a sub-atmospheric pressure within the container interior so that atmospheric pressure acting against disc 58 will flex it inwardly to unseat fluid bore 61 as valve 62 moves into juxtaposition with recess 57 as shown in phantom outline in FIG. 10. Air is thus permitted to freely enter the container through the same fluid passageway via an opening 53 and a slot 55 for replacing the dispelled product. Likewise as described with reference to FIG. 1, equalization of pressure on opposite sides of the disc will permit it to resume its unstressed condition (FIG. 9).

The dispensing closure may have its valve pintle designed without opposing slots 55 and be instead provided with at least one longitudinally extending rib 72 along its pintle 54*a* as in FIG. 11, or have at least one longitudinally extending groove 73 in its pintle 54*b*, as in FIG. 12. In either case, the fluid bore and thus the fluid passageway is opened in response to super-atmospheric pressure within the bottle as valve 62 is moved into juxtaposition with such rib or such groove. Flow of product outwardly of the closure proceeds then through fluid opening 53 in an open rotational position of the overcap. And, it should be pointed out that recess 57 may be replaced by a similar longitudinal groove or rib lying upstream of the valve seat for facilitating venting, without departing from the invention. Such likewise applies to the FIGS. 13 and 16 embodiments to be hereinafter described.

FIGS. 13 to 15 represent the further embodiment according to the invention similar to that of FIGS. 8 to 10 so that like parts and elements will be designated by like reference numerals. Here, discharge orifice 67 in end wall 66 of the overcap is aligned with the overcap rotational axis and overlies the open end of hollow pintle 54. An inwardly extending sleeve 74 on end wall 66 projects into the hollow pintle and has a pair of opposed slots 75 therein which, in an open rotational position of the overcap of FIG. 14, are in alignment with slots 55 in readiness for the dispensing of product from the container in the same manner as the foredescribed for the other embodiments. Again, venting of the container interior to the atmosphere occurs through the same fluid passageway which opens in response to a subatmospheric pressure in the bottle as valve 62 moves to its phantom outline position of FIG. 14. Rotation of the overcap into a position of FIG. 15 with slots 75 and 55 misaligned, closes the fluid passageway in a non-use and/or storage condition of the bottle. Stop elements 69*a*, 69*b* on cap 51, and stop element 71 on the overcap are provided for indexing the rotation of the overcap at open and closed rotational positions in the same manner as described with reference to FIG. 8.

Figure 16:
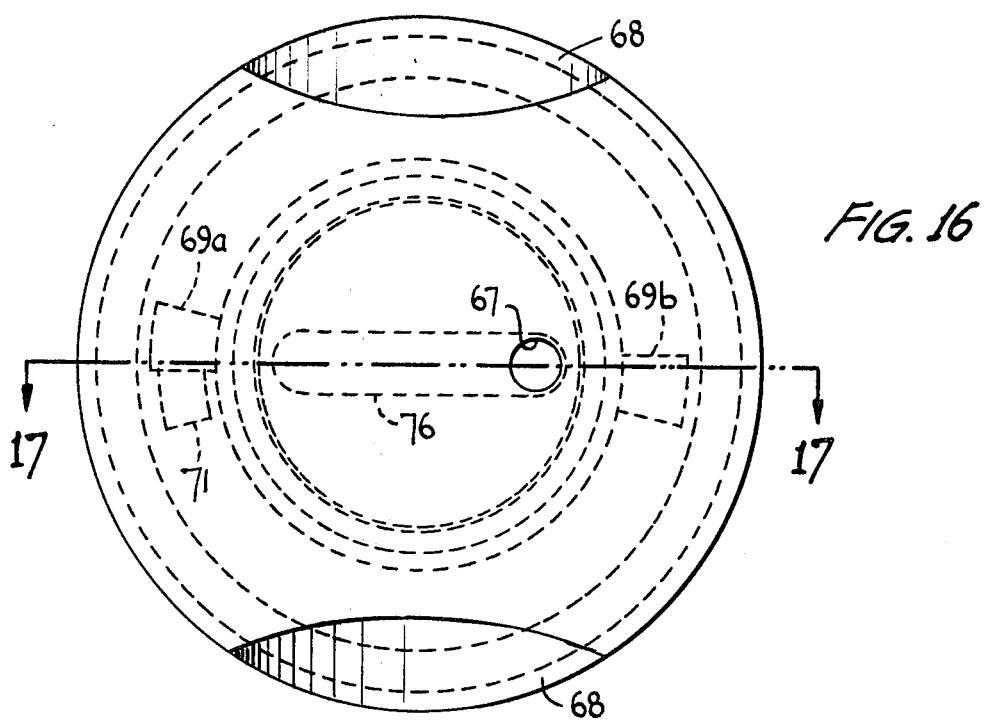
FIG. 16 is a plan view of a still further embodiment of the dispensing closure according to the invention.
Figure 17:
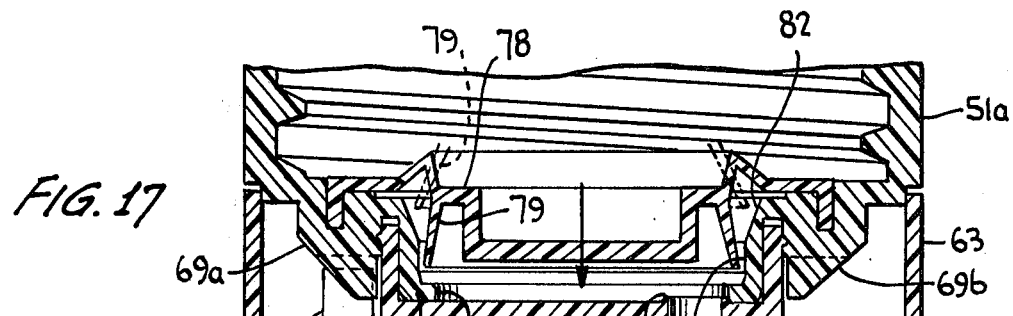
FIGS. 17 and 18 are sectional views taken substantially along the line 17—17 of FIG. 16 respectively showing dispensing and valve closing positions.
Figure 18:
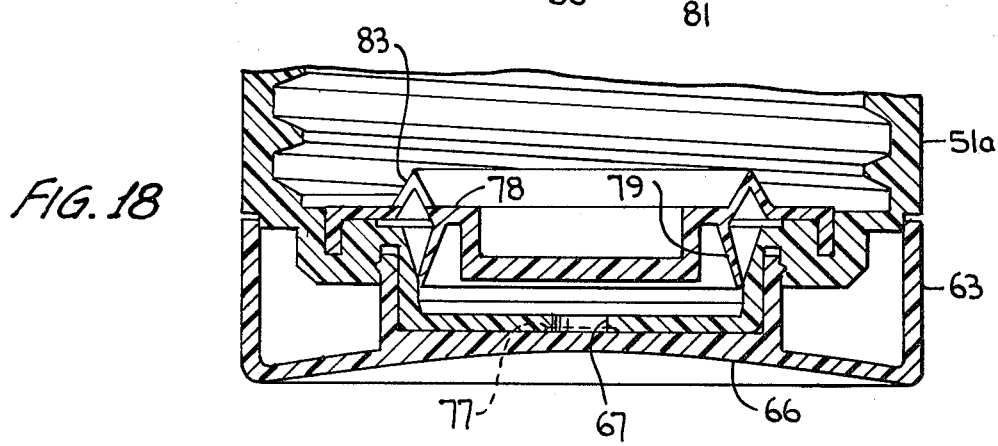

In yet another embodiment of a dispensing closure according to the invention, shown in FIGS. 16 to 18, cap 51*a* has an elongated slot 76 defining opening in its end wall 52. The pintle is eliminated; otherwise the dispensing cap is the same as in FIG. 8.

And, overcap 63 is the same as that of FIG. 8 with its discharge orifice 67 radially offset from the rotational axis of the overcap to an extent less than the maximum extent of slot 76 from such axis. Surrounding the discharge orifice 67 at the inner surface of end wall 66 is an embossment 77 for improving upon the seal of fluid opening 76 as it presses against the cap at the outer surface of wall 52 in the FIG. 18 closed position.

A disc 78, similar to disc 17 of FIG. 1, has an annular valve 79 integrally formed thereon or otherwise attached thereto which sealingly engages a valve seat 81 in an unstressed condition of the disc as shown in FIG. 17. As in the FIG. 1 embodiment, this valve seat is defined by an inner annular surface of the cap, and a wall 82 of greater diameter defines the recess in this inner annular surface and lies upstream of the valve seat. However, unlike that of FIG. 1 closure, no larger wall diameter defining a recess lies downstream of the valve seat. And, the disc contains at least one fluid bore 83 lying outwardly of valve 79, and the overcap has an inwardly extending stop element 71 which abuts against one or the ohher of stop elements 69*a*, 69*b* provded on cap 51*a* for limiting relative turning movement of the overcap between its open and closed positions of FIG. 17 and 18. Thus, during operation, the cap is rotated into its open position of FIGS. 16 and 17 whereupon discharge orifice 67 overlies fluid opening 76 and, as pressure is applied to the deformable container or squeeze bottle, as during a manual squeeze stroke, disc 78 is caused to flex outwardly in the direction of the arrow of FIG. 18 and its valve 79 is caused to flex inwardly away from the valve seat in response to the super-atmospheric pressure created within the bottle to thereby open the fluid passageway permitting the outflow of product. And, as pressure from the container is released and is permitted to expand between squeeze strokes, the reexpansion tendency produces a sub-atmospheric pressure within the container so that the atmospheric pressure acting against disc 78 will flex it inwardly to its phantom outline position of FIG. 17 whereupon air is permitted to freely enter the container to replace a like amount of expelled product. Thereafter, in a non-use and/or storage condition of the bottle, the overcap is rotated to its closed position of FIG. 18 for positively sealing the fluid passageway closed.

As in the FIGS. 8 and 13 embodiments, disc 78 may be in the form of a bellows spring which renders at least a portion of the disc resilient adjacent its valve to permit the valve to shift from its valve seat in both directions in response to super-atmospheric and sub-atmospheric pressures within the bottle. The valves formed on the discs on each of the aforedescribed embodiments may be of like flexible resilient material as that of the disc from which it extends. And, the internally threaded caps as aforedescribed may be replaced by snap-fitting caps without departing from the invention.

From the foregoing it can be seen that a self-venting dispensing closure for squeeze bottles has been devised with a minimum number of parts and is adapted for economical mass production by conventional plastic molding techniques.

Obviously, many other modifications and variations of the present invention are made possible in the light of the above teachings. It is therefore to be understood that within the scope of the appended claims the invention may be practiced otherwise than as specifically described.

What is claimed is:

1. A self-venting dispensing closure for fluid-tight engagement with a squeeze bottle, comprising a cap containing a fluid opening, a disc on said cap containing a fluid bore which defines together with said fluid opening a single fluid passageway through the closure, said cap including an annular wall having a first portion defining a valve seat lying upstream of said fluid opening in the direction of product flow through said passageway, said disc having an annular valve thereon in engagement with said valve seat in a first position for closing said fluid passageway, at least a portion of said disc adjacent said valve being flexible to permit shifting of said valve along said annular wall into second and third positions respectively upstream and downstream of said valve seat in response to sub-atmospheric and super-atmospheric pressures within the bottle, first and second means on said annular wall respectively lying upstream and downstream of said valve seat to permit said fluid passageway to open respectively into bottle venting and dispensing positions corresponding to said second and third positions of said valve.

2. The closure according to claim 1, wherein said first and second means comprise recesses in said annular wall.

3. The closure according to claim 2, wherein said fluid bore and said portion of said disc lie outwardly of said valve.

4. The closure according to claim 1, wherein means in engagement with said cap is provided for closing said fluid passageway in a non-use and/or storage condition of the bottle.

5. The closure according to claim 1, wherein said cap has an end wall containing said fluid opening, a pintle extending inwardly from said end wall and defining said annular wall, said fluid bore in said disc surrounding said pintle and said valve being defined along an edge of said fluid bore.

6. The closure according to claim 5, wherein said first means comprises a recess in said annular wall, said second means comprising a longitudinally extending groove in said annular wall.

7. The closure according to claim 5, wherein said first means comprising a recess in said annular wall, said second means comprising a longitudinally extending rib on said annular wall.

8. The closure according to claim 5, wherein said pintle is hollow, said first means comprising a recess in said annular wall and said second means comprising a slot in a side wall of said pintle in communication with said fluid opening.

9. The closure according to claim 5, 6, 7 or 8 wherein an overcap is rotatably mounted on said cap and has an orifice that is radially offset from the rotational axis of said overcap, said fluid opening underlying said orifice in an open rotational position of said overcap, and said orifice being misaligned with said fluid opening in a closed rotational position of said overcap.

10. The closure according to claim 5, wherein said pintle is hollow and lies along the central axis of said cap and has an open end defining said fluid opening, said first means comprising a recess in said annular wall and said second means comprising a slot in a side wall of said pintle in communication with said open end.

11. The closure according to claim 10, wherein an overcap is rotatably mounted on said cap and has a central orifice overlying said fluid opening, a sleeve extending from said overcap into said pintle and having a slot in a side wall thereof in alignment with said pintle slot in an open rotational position of said overcap, said slots being out of alignment in a closed rotational position of said overcap.

12. The closure according to claim 10 or 11, wherein said disc comprises a bellows spring.

13. A self-venting dispensing closure for fluid-tight engagement with a squeeze bottle, comprising a cap containing a fluid opening, a disc on said cap containing a fluid bore which defines together with said fluid opening a single fluid passageway through the closure, said cap including an annular wall having a first portion defining a valve seat lying upstream of said fluid opening in the direction of product flow through said passageway, said disc having an annular valve thereon in engagement with said valve seat in a first position for closing said fluid passageway, at least a portion of said disc adjacent said valve being flexible to permit shifting of said valve along said annular wall into at least a second position upstream of said valve seat in response to sub-atmospheric pressure within the bottle, means on said annular wall upstream of said valve seat to permit said fluid passageway to open into a bottle venting position corresponding to said second position of said valve, and said valve being flexible for opening said fluid passageway into a dispensing position upon flexing movement away from said annular wall in response to super-atmospheric pressure within the bottle.

14. The closure according to claim 13, wherein said means comprises a recess in said annular wall.

15. The closure according to claim 14, wherein said fluid bore and said portion of said disc lie outwardly of said valve.

16. The closure according to claim 13, wherein said cap has an end wall containing said fluid opening, an overcap being rotatably mounted on said cap and having an orifice that is radially offset from the rotational axis of said overcap, said fluid opening underlying said orifice in an open rotational position of said overcap, and said orifice being misaligned with said fluid opening in a closed rotational position of said overcap.

* * * * *